A. E. MOOK.
Thill-Coupling.

No. 207,433.  Patented Aug. 27, 1878.

Witnesses.
O. L. Pond.
Amos W. Sangster.

Inventor.
Anson E. Mook,
Per. James Sangster
Atty

UNITED STATES PATENT OFFICE.

ANSON E. MOOK, OF PEMBROKE, NEW YORK.

IMPROVEMENT IN THILL-COUPLINGS.

Specification forming part of Letters Patent No. 207,433, dated August 27, 1878; application filed June 24, 1878.

*To all whom it may concern:*

Be it known that I, ANSON E. MOOK, of East Pembroke, in the county of Genesee and State of New York, have invented certain new and useful Improvements in Thill-Couplings, which improvements are fully set forth in the following specification and accompanying drawings, in which—

Figure 1:
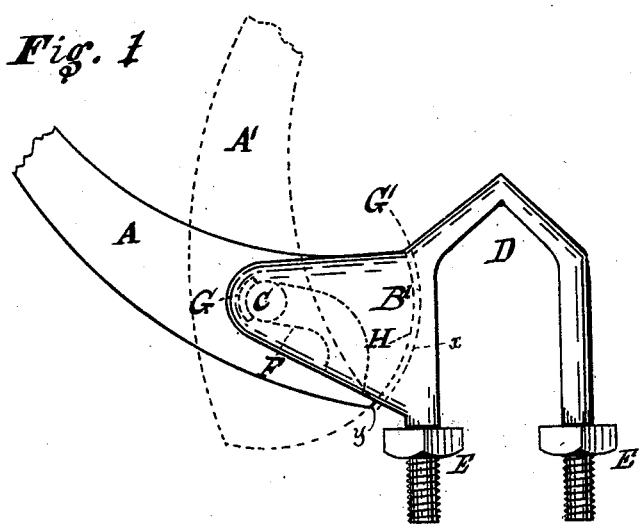
Figure 2:
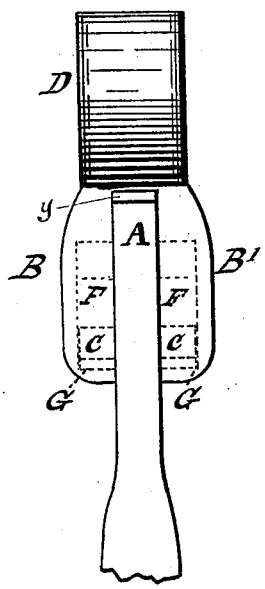
Figure 3:
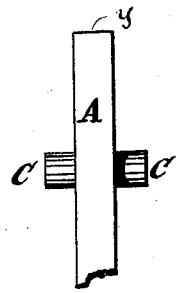

Figure 1 is a side elevation; Fig. 2, a plan or top view, and Fig. 3 represents a portion of the thill-iron separate from the coupling.

The object of this invention is, first, to provide the means whereby the thills may be readily connected or separated, and so that when fastened in place it will be impossible for them to be disconnected by the ordinary usage; second, to permit the self-release of the thills from the vehicle should the horse become unmanageable and rear upon his hind feet; third, to provide for wear and rattling, and to prevent dust and dirt from getting into the working parts; and it consists of a clip or coupling having two jaws projecting forward and formed in one piece with it, so as to be more secure, and provided with slots or grooves on the inside, so formed that the connection with the thills may be made from the lower side by a movement upward and forward, in combination with a thill-iron curved at the head to correspond with the curve in the back of the opening between the jaws, and two pins or projections to correspond with the slots or grooves in the jaws, as will more clearly appear by reference to the drawings, in which—

D is the clip or coupling, having a curved face, $x$; B B', the jaws, projecting forward and forming a part of the clip or coupling D. The jaws B B' have each a groove or slot, opening downward, the form of which is shown by dotted lines F in Fig. 1, and the depth, or about the depth, by the dotted lines F in Fig. 2.

A represents the thill-iron, having the outer end, $y$, curved, as shown by dotted lines H, Fig. 1, so as to fit and move easily in the curved back of D between the jaws. If desired, a strip of leather, H, or other similar material, may be put in to prevent rattling.

C C represent the pins or projections on each side of A, as shown in Fig. 3, and also by dotted lines in Figs. 1 and 2.

G G in Figs. 1 and 2 represent a strip of leather or rubber fastened in the front parts of the grooves F, (shown by dotted lines,) to prevent the wearing of the pins C and rattling of the parts.

The thills are detached by turning them on the pins C into the position shown by dotted lines A, the outer end of A moving in the curve G', (see Fig. 1,) and then moving them back, so that the pins C C will pass downward and out of the grooves.

I claim as my invention—

The clip D, having jaws B B' formed in one piece with it, and provided with a curved face, $x$, and with grooves F, opening downward, as specified, in combination with the thill-iron A, provided with the curved rear end, $y$, and side pins or projections, all substantially as and for the purposes described.

ANSON E. MOOK.

Witnesses:
 JAMES SANGSTER,
 A. J. SANGSTER.